US011663341B2

(12) United States Patent
McClintock et al.

(10) Patent No.: US 11,663,341 B2
(45) Date of Patent: *May 30, 2023

(54) TRACKING DEVELOPER BEHAVIOR WITH RESPECT TO SOFTWARE ANALYSIS TOOLS

(71) Applicant: Amazon Technologies, Inc., Seattle, WA (US)

(72) Inventors: Jon Arron McClintock, Seattle, WA (US); Alun Jones, Woodinville, WA (US); Narasimha Rao Lakkakula, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 542 days.

This patent is subject to a terminal disclaimer.

(21) Appl. No.: 16/723,479

(22) Filed: Dec. 20, 2019

(65) Prior Publication Data
US 2020/0125736 A1 Apr. 23, 2020

Related U.S. Application Data

(62) Division of application No. 15/651,277, filed on Jul. 17, 2017, now Pat. No. 10,528,743, which is a division of application No. 14/517,018, filed on Oct. 17, 2014, now Pat. No. 9,727,736.

(51) Int. Cl.
G06F 21/57 (2013.01)
G06F 8/71 (2018.01)
G06F 8/77 (2018.01)
G06F 11/36 (2006.01)

(52) U.S. Cl.
CPC ............. *G06F 21/577* (2013.01); *G06F 8/71* (2013.01); *G06F 8/77* (2013.01); *G06F 11/3604* (2013.01)

(58) Field of Classification Search
CPC . G06F 21/577; G06F 8/71; G06F 8/77; G06F 11/3604
See application file for complete search history.

(56) References Cited

U.S. PATENT DOCUMENTS

| 7,284,274 | B1 * | 10/2007 | Walls | G06F 8/70 726/25 |
| 7,549,158 | B2 * | 6/2009 | Shelest | H04L 63/102 726/1 |
| 8,250,563 | B2 * | 8/2012 | Chefalas | G06F 8/70 717/171 |

(Continued)

*Primary Examiner* — Douglas M Slachta
(74) *Attorney, Agent, or Firm* — Thomas Horstemeyer, LLP

(57) ABSTRACT

Disclosed are various embodiments for tracking developer behavior with respect to software analysis tools. In one embodiment, a security analysis is performed upon a first revision of a program, where the security analysis is based at least in part on a plurality of rules. A first security issue found in the security analysis upon the first revision of the program is identified. The security analysis is performed upon a second revision of the program. A second security issue found in the security analysis upon the second revision of the program is identified. The rules are updated based at least in part on whether the first security issue is corrected in the second revision as determined based at least in part on a comparison of the first security issue to the second security issue.

20 Claims, 6 Drawing Sheets

(56) References Cited

U.S. PATENT DOCUMENTS

| | | | | |
|---|---|---|---|---|
| 8,499,353 | B2* | 7/2013 | Lockhart | G06F 11/3612 726/25 |
| 8,527,814 | B1* | 9/2013 | Elwell | G06F 11/0793 717/124 |
| 8,555,273 | B1* | 10/2013 | Chia | G06F 8/654 717/172 |
| 8,607,349 | B1* | 12/2013 | Zaitsev | G06F 21/566 713/188 |
| 8,892,954 | B1* | 11/2014 | Gray | G06F 8/71 714/38.11 |
| 9,058,428 | B1* | 6/2015 | Siddiqui | G06F 11/3433 |
| 9,223,972 | B1* | 12/2015 | Vincent | H04L 63/1425 |
| 10,084,819 | B1* | 9/2018 | Nogin | H04L 63/20 |
| 10,135,856 | B2* | 11/2018 | Tripp | H04L 63/1433 |
| 2006/0069956 | A1* | 3/2006 | Steinberg | H04L 41/0609 714/25 |
| 2011/0270963 | A1* | 11/2011 | Saito | G06F 11/302 709/224 |
| 2013/0276056 | A1* | 10/2013 | Epstein | G06F 9/45558 726/1 |
| 2014/0095934 | A1* | 4/2014 | Dancy | G06F 11/3684 714/E11.177 |
| 2014/0096184 | A1* | 4/2014 | Zaitsev | G06F 21/50 726/1 |
| 2014/0245450 | A1 | 8/2014 | Oberheide et al. | |
| 2014/0289719 | A1 | 9/2014 | Dewan | |
| 2015/0040182 | A1 | 2/2015 | Chambers et al. | |
| 2015/0355998 | A1* | 12/2015 | Kogan-Katz | G06F 8/70 717/101 |
| 2016/9300065 | | 10/2016 | Bang | |
| 2017/0169223 | A1* | 6/2017 | Lin | G06F 21/563 |

* cited by examiner

TRACKING DEVELOPER BEHAVIOR WITH RESPECT TO SOFTWARE ANALYSIS TOOLS

CROSS-REFERENCE TO RELATED APPLICATIONS

This application is a division of, and claims priority to, co-pending U.S. patent application entitled "IDENTIFYING CHARACTERISTICS OF PROBLEMATIC DEVELOPERS OF SOFTWARE," filed on Jul. 17, 2017, and assigned application Ser. No. 15/651,277, which is a division of, and claims priority to, U.S. patent application entitled "TRACKING DEVELOPER BEHAVIOR WITH RESPECT TO SOFTWARE ANALYSIS TOOLS," filed on Oct. 17, 2014, assigned application Ser. No. 14/517,018, issued on Aug. 8, 2017, and assigned U.S. Pat. No. 9,727,736, both are incorporated herein by reference in there entireties.

BACKGROUND

Software is seldom without errors, as humans are prone to make mistakes when writing code. Some errors may be innocuous, while others may result in serious security vulnerabilities or performance problems. Various tools exist to help developers in finding errors in their code. Such tools may comprise static analysis tools, which perform an analysis upon code that is not executed, and dynamic analysis tools, which perform an analysis upon the behavior of executed code. The tools may analyze source code and/or compiled code. Implementation techniques of the analysis may include model checking, data-flow analysis, abstract interpretation, Hoare logic, symbolic execution, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
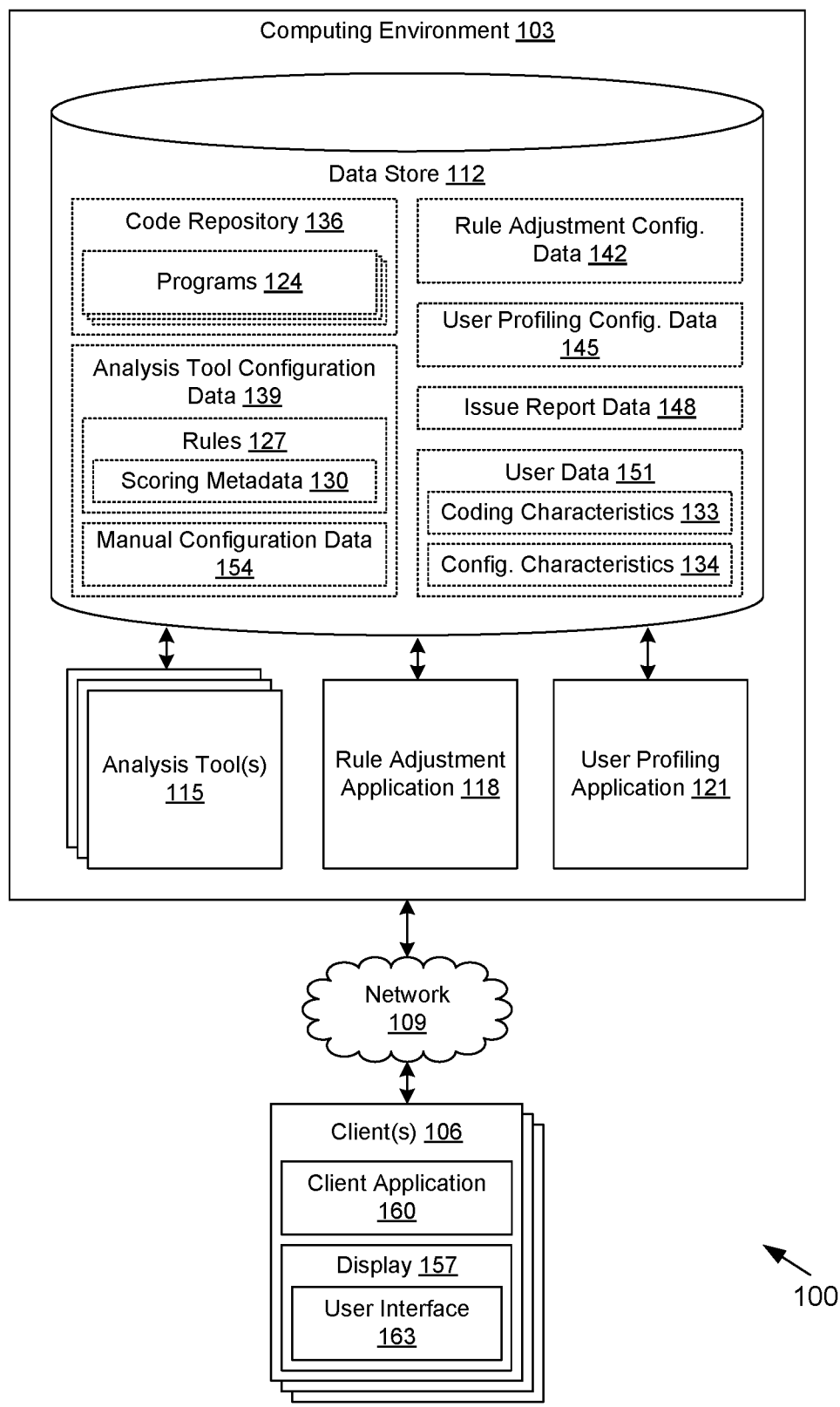
FIG. 1 is a schematic block diagram of a networked environment according to various embodiments of the present disclosure.

The present application relates to tracking behavior of developers with respect to software analysis tools. Software analysis tools may identify a large number of errors in any given program. These errors may vary in severity and in complexity to correct. Upon running the analysis tool upon the code, the developer may be presented with a report detailing the errors found. The errors may, for example, be grouped by category and ranked in severity. Unfortunately, software analysis tools often report many false positives for errors. It may be difficult for a developer to focus on issues that need to be corrected while being overwhelmed by a report containing many false positives. Manual developer configuration of the rule sets underlying the software analysis tools may be unlikely to be beneficial as many developers may be unaware of the security implications of the rules.

Various embodiments of the present disclosure facilitate reactive tuning of the rule sets underlying software analysis tools in view of observed developer behavior. Developers and teams of developers, upon reviewing software analysis reports, may choose to correct or not to correct reported issues. In one embodiment, the developers may manually indicate whether a reported issue has been corrected. In another embodiment, the final code may be rescanned to determine automatically whether a reported issue has been corrected. Ultimately, the developer behavior data is leveraged to modify the analysis rule set. Rules that result in a large number of false positives (i.e., issues that are ignored by developers) may be disabled, or the issues they raise may be deprioritized in a report.

Further, some developers may be the source of more errors (and potentially, more severe errors) than others. The error-prone developers may use certain styles or patterns in writing their source code. While an analysis tool may identify that an issue exists in analyzed source code, the analysis tool may not identify an underlying cause as to why the code was written in such a way as to cause the issue.

Various embodiments of the present disclosure identify coding patterns or styles of developers that are likely to result in security and performance issues. The results of software analysis tools for a variety of code may be processed to determine specific developers who are associated with a greater frequency of issues or particularly severe issues. The code authored by the specific developers is analyzed to determine a coding pattern or style that may differentiate the code of the specific developers from code authored by other developers. The determined coding pattern or style may then be reported. For example, it may be determined that developers associated with problematic code frequently use single letter variable names or that their code embodies other stylistic characteristics. The concepts discussed herein may also be extended to operational configurations, which may also suffer from configuration issues. In some embodiments, code or configurations may be submitted for screening against characteristics associated with problematic developers or users who write configurations. Such screening may, for example, be useful in evaluating candidates for developer positions or system administrator positions.

In the following discussion, a general description of the system and its components is provided, followed by a discussion of the operation of the same.

With reference to FIG. 1, shown is a networked environment 100 according to various embodiments. The networked environment 100 includes a computing environment 103 and one or more clients 106, in data communication with each other via a network 109. The network 109 includes, for example, the Internet, intranets, extranets, wide area networks (WANs), local area networks (LANs), wired networks, wireless networks, cable networks, satellite networks, other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks, computer banks, or other arrangements. Such computing devices may be located in a single installation or may be distributed among many different geographical locations. For example, the computing environment 103 may include a plurality of computing devices that together may comprise a hosted or "cloud" computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include one or more analysis tools 115, a rule adjustment application 118, a user profiling application 121, and other applications, services, processes, systems, engines, or functionality not discussed in detail herein. The analysis tools 115 may comprise any tool or application operable to perform an analysis upon a program 124 and/or portions of programs 124. The analysis may be used to identify security issues or vulnerabilities in a program 124. For instance, the analysis may identify an error in the code of a program 124 that could allow a malicious user to gain root privileges. As understood herein, security issues may encompass performance and availability issues. In this regard, the analysis may identify an error resulting in excessive resource consumption that could adversely impact the computing device upon which the program 124 is executed.

The analysis tools 115 may perform analysis on source code, byte code, binary code, and/or other forms of code that comprise a program 124. The analysis tools 115 may be specific to certain programming languages, byte code types, machine code types, and so on, or may operate upon multiple languages and code formats. The analysis tools 115 may perform static analysis and/or dynamic analysis upon a program 124. The analysis tools 115 may generate reports detailing the issues that have been detected. The generated reports may categorize the detected issues according to type and may rank the detected issues according to severity or priority. Non-limiting examples of commercially available analysis tools 115 include HP FORTIFY, COVERITY Code Advisor, KLOCWORK, etc.

The rule adjustment application 118 is executed to adjust the configuration of the analysis tools 115 in response to developer behavior. Analysis tools 115 often err on the side of caution, resulting in numerous false positives (i.e., false detections of security vulnerabilities). Developers may recognize these false positives (intuitively or with some investigation) and conclude that the particular detected issues will not be addressed. While some detected issues may not be addressed because of developer error or because their correction would be labor intensive, often the unaddressed issues will correspond to false positives.

Over a large and diverse code base maintained by multiple developers, patterns of false positives may emerge. The rule adjustment application 118 is executed to identify these patterns based at least in part on whether developers are correcting the issues between previous and current revisions of the programs 124. If a certain issue is being ignored by the developers, the rule adjustment application 118 may alter the configuration of the analysis tools 115 either to disable a rule 127 that is provoking the false positive or to assign a lesser weight in the scoring metadata 130 to the rule 127 that is provoking the false positive.

The user profiling application 121 is executed to determine specific developers (or teams of developers) who are responsible for at least a threshold quantity of security issues. Once the developers are identified, their programs 124 may be further analyzed to identify coding characteristics 133. In some cases, configurations may be analyzed to determine configuration characteristics 134. In some examples, these coding characteristics 133 may relate purely to style. It may be determined, for example, that programs 124 using a specific indentation style are associated with specific types of issues and/or a greater frequency of issues as compared to programs 124 that do not use the specific indentation style. Ultimately, the analysis performed via the user profiling application 121 may be used to determine coding styles or patterns that may lead, perhaps indirectly, to security vulnerabilities. The user profiling application 121 may also be executed to score submitted code or configurations to determine whether they embody characteristics associated with problematic developers or configuration authors.

The data stored in the data store 112 includes, for example, a code repository 136, analysis tool configuration data 139, rule adjustment configuration data 142, user profiling configuration data 145, issue report data 148, user data 151, and potentially other data. The code repository 136 includes one or more programs 124 that may be used for analysis purposes. The code repository 136 may control revisions, release sequences, check-ins, and versioning of the programs 124 and may identify developers who wrote the programs 124 or portions thereof or developers are otherwise associated with the programs 124. The programs 124 may correspond to source code, byte code, machine code, binary code, and/or other forms of code that may be subject to analysis by the analysis tools 115. As used herein, the term "program" may refer to a specific class, object, method, function, file, and/or any other form of code division that may correspond to a portion of a larger program.

The analysis tool configuration data 139 configures the operation of the analysis tools 115. In this regard, the analysis tool configuration data 139 may include a plurality of rules 127, the application of which may identify possible issues in programs 124. For example, a particular rule 127 may evaluate whether the return value of a function call is checked for errors. Rules 127 may be associated with corresponding scoring metadata 130 that may be used for ranking or scoring identified issues by priority, impact, potential severity, ease of exploitability, and/or importance. In one embodiment, the scoring is according to the common vulnerability scoring system (CVSS), which includes a variety of factors that make up a score. In modifying the scoring metadata 130, one or more of such factors may be modified responsive to developer behavior. The analysis tool configuration data 139 may also include manual configuration data 154 that may allow developers to manually select or configure rules 127 to be enabled, disabled, adjusted, have a specific priority, and so on.

The rule adjustment configuration data 142 may include various parameters, thresholds, and/or other settings that configure the operation of the rule adjustment application 118. For example, the rule adjustment configuration data 142 may establish minimum sample sizes, minimum frequencies of occurrence, and/or other parameters for a given issue to be considered a false positive based upon the issue being identified but not corrected in subsequent revisions of programs 124.

The user profiling configuration data 145 may include various parameters, thresholds, and/or other settings that configure the operation of the user profiling application 121. This may include identification of problematic developers and/or identification of coding characteristics 133 pertaining to the problematic developers. For example, the user profiling configuration data 145 may configure developers to be identified based upon writing code that contains at least five security vulnerabilities classified as severe. As another example, the user profiling configuration data 145 may designate variable name characteristics as potentially important coding characteristics 133 to be identified.

The issue report data 148 corresponds to reports of security issues generated by the analysis tools 115. The issue report data 148 may identify specific revisions of programs 124 to which a report pertains, along with a plurality of identified security issues. The identified security issues may be grouped in categories and/or arranged in priority order. The issue report data 148 may be formatted as a network page (e.g., a web page) or other document for presentation by a client 106. Alternatively, the issue report data 148 may be in a machine-readable (parseable) format such as, for example, extensible markup language (XML), yet another markup language (YAML), JavaScript object notation (JSON), comma separated values (CSV), and/or other formats.

The user data 151 includes information relating to developer users, teams of developer users, configuration users, and/or teams of configuration users. Each user may be associated with a specific account or identity that may be used in tracking contributions to programs 124 in the code repository 136. Thus, specific security issues identified by the analysis tools 115 may be attributed to particular developers. Coding characteristics 133 may then be determined using the user profiling application 121 and may be associated with the security issues introduced by the developer's code. Configuration characteristics 134 may be associated with configuration users.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 157. The display 157 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 106 may be configured to execute various applications such as a client application 160 and/or other applications. The client application 160 may be executed in a client 106, for example, to access network content served up by the computing environment 103 and/or other servers, thereby rendering a user interface 163 on the display 157. To this end, the client application 160 may comprise, for example, a browser, a dedicated application, etc., and the user interface 163 may comprise a network page, an application screen, etc. The client 106 may be configured to execute applications beyond the client application 160 such as, for example, software development environment applications, compiler applications, email applications, social networking applications, word processors, spreadsheets, and/or other applications.

Next, a general description of the operation of the various components of the networked environment 100 is provided. To begin, a developer may publish a revision of a program 124 to the code repository 136 and request that one or more analysis tools 115 be run. In one embodiment, the analysis tool 115 may be run on a local machine, such as a client 106. In such a case, the analysis tool 115 may be configured to report its results to the computing environment 103 for storage in the data store 112 as issue report data 148. In another embodiment, the analysis tool 115 may be operated as a service. The program 124 may be uploaded to the analysis tool 115, or the analysis tool 115 may be configured to retrieve the program 124 from the repository.

Ultimately, the analysis tool 115 generates a report, which is then communicated to a developer. The report may list many identified security issues, such as potential buffer overflows, memory leaks, cross site scripting issues, uninitialized variables, and so on. Some of the identified issues may be in fact false positives. For example, an analysis tool 115 may warn that a certain variable is null, but the analysis tool 115 may be unable to detect that all uses of the variable are after the variable has been initialized with a constant in other code.

The developer may review the report and elect to correct or not to correct the identified issues. Subsequently, the developer may publish an updated revision of the program 124 to the code repository 136. While the developer may, in some cases, explicitly specify which issues will be fixed and which will not, it may generally be a better experience simply to perform a follow-up analysis upon the updated program 124 using the same analysis tool 115. If the same issues are present, the developer has likely elected to avoid correcting them.

The rule adjustment application 118 may then be executed to determine which of the issues have been corrected and which have been ignored. Over a large sample set, the rule adjustment application 118 may then determine which issues (and rules 127 driving the issues) are relatively unimportant. Thus, the rule adjustment application 118 may adjust the analysis tool configuration data 139 to deprioritize or disable detection of certain issues.

The user profiling application 121 may be executed to identify developers who are commonly associated with security issues and/or are associated with particularly severe security issues. The user profiling application 121 may perform a source code analysis on source code of the developer to identify coding characteristics 133 of the developer that are correlated with, and may potentially be causing, the security vulnerabilities. For instance, the user profiling application 121 may determine that 80% of developers who use single-letter variable names also tend to ignore encoding output that leads to cross site scripting vulnerabilities.

In various embodiments, the rule adjustment application 118 and the user profiling application 121 may be standalone applications executed upon a client 106. Alternatively, the rule adjustment application 118 and the user profiling application 121 may be operated as a service, accessible via the network 109 by clients 106.

Figure 2:
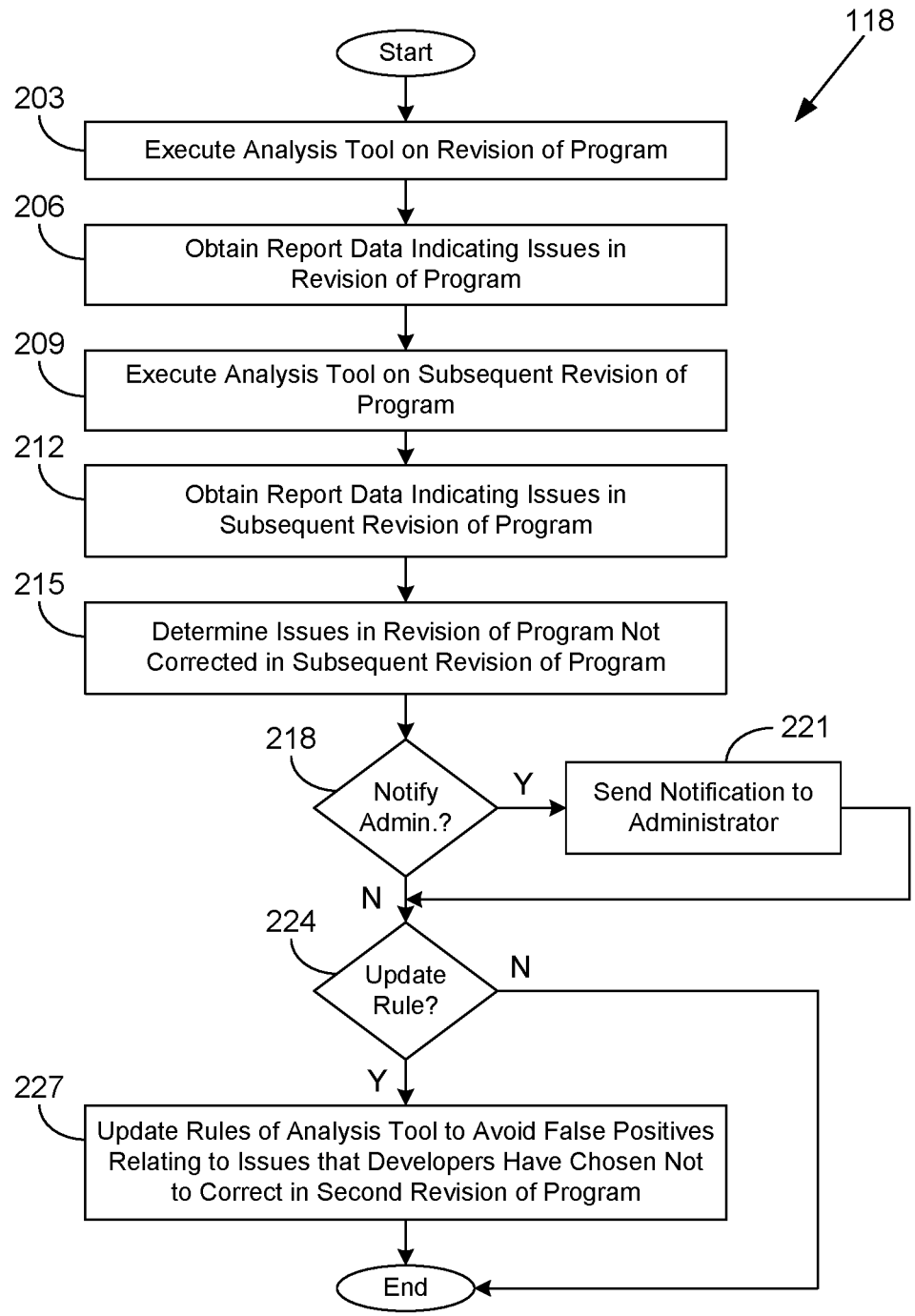
FIG. 2 is a flowchart illustrating one example of functionality implemented as portions of a rule adjustment application executed in a computing environment in the networked environment of FIG. 1 according to various embodiments of the present disclosure.

Referring next to FIG. 2, shown is a flowchart that provides one example of the operation of a portion of the rule adjustment application 118 according to various embodiments. It is understood that the flowchart of FIG. 2 provides merely an example of the many different types of functional arrangements that may be employed to implement the operation of the portion of the rule adjustment application 118 as described herein. As an alternative, the flowchart of FIG. 2 may be viewed as depicting an example of elements of a method implemented in the computing environment 103 (FIG. 1) according to one or more embodiments.

Beginning with box 203, the rule adjustment application 118 executes an analysis tool 115 (FIG. 1) upon a revision of a program 124 (FIG. 1). The analysis tool 115 may perform a static analysis or a dynamic analysis. In some cases, the analysis tool 115 may have been previously executed upon the revision of the program 124 (e.g., by a developer), and the results may have been cached. In box 206, the rule adjustment application 118 obtains issue report data 148 (FIG. 1) indicating the issues that are present in the revision of the program 124. In some cases, a developer or other user may manually specify via the manual configuration data 154 that certain rules 127 (FIG. 1) in the analysis tool configuration data 139 (FIG. 1) are to be ignored, disabled, associated with lower weights in scoring metadata 130 (FIG. 1), and so on.

In box 209, the rule adjustment application 118 executes the same analysis tool 115 upon a subsequent revision of the program 124 (e.g., an updated version). In one embodiment, the rule adjustment application 118 may automatically execute the analysis tool 115 upon receiving the subsequent revision of the program 124. The rule adjustment application 118 may detect the existence of the subsequent revision of the program 124 automatically via the code repository 136 (FIG. 1). In box 212, the rule adjustment application 118 obtains issue report data 148 indicating the issues that are present in the subsequent revision of the program 124. In other embodiments, the rule adjustment application 118 may learn whether an issue is corrected via a trouble ticket system, revision metadata, and/or other approaches that do not necessarily involve a second execution of the analysis tool 115. In box 215, the rule adjustment application 118 determines the issues that were present in the revision of the program 124 that are not corrected in the subsequent revision of the program 124.

In box 218, the rule adjustment application 118 determines whether to notify an administrator of the issues that are not corrected. For example, a certain minimum time window or minimum number of revisions may be used as hysteresis to avoid notifying the administrator of issues that are corrected in a closely following subsequent revision. Also, a broader sample size may be used, so that only issues that are overlooked in at least a minimum threshold of instances result in notification. If an administrator is to be notified, a notification is sent to the administrator in box 221. The notification may take the form of a phone call, a text message, an email, an update in a network page, or other forms of notification. The rule adjustment application 118 continues to box 224. If the administrator is not to be notified, the rule adjustment application 118 transitions from box 218 to box 224.

In box 224, the rule adjustment application 118 determines whether to update rules 127 of the analysis tool 115. For example, a certain minimum time window or minimum number of revisions may be used as hysteresis to avoid modifying rules 127 based on issues that are corrected in a closely following subsequent revision. Also, a broader sample size may be used, so that only issues that are overlooked in at least a minimum threshold of instances (e.g., number of developers, number of affected programs 124, number of specific occurrences, etc.) result in updating the rules 127. If the rules 127 are to be updated, the rule adjustment application 118 continues to box 227. Otherwise, the option of the portion of the rule adjustment application 118 ends.

In box 227, the rule adjustment application 118 updates rules 127 of the analysis tool 115 in order to avoid detecting false positives. The false positives relate to issues that were reported by the analysis tool 115 as being present in the revision of the program 124 but that the developers have chosen not to correct in the subsequent revision of the program 124. For example, the rule adjustment application 118 may disable a rule 127 or modify one or more factors in scoring metadata 130 for a rule 127 that is associated with an issue that is not corrected in the subsequent revision of the program 124.

Further, the rule adjustment application 118 may reduce a weight in the scoring metadata 130 of a rule 127 associated with an issue that is not corrected in the subsequent revision of the program 124. Other modifications to the analysis tool configuration data 139 (FIG. 1) may be performed based at least in part on a status of the issues in the subsequent revision of the program 124, e.g., whether the issues are corrected or not corrected in the subsequent revision of the program 124. Thereafter, the operation of the portion of the rule adjustment application 118 ends.

Although the discussion of FIG. 2 primarily focuses on a single program 124 having an updated revision, it is understood that the rule adjustment application 118 may operate upon a code repository 136 including many different programs 124 modified by many different developers. In one embodiment, the rules 127 are adjusted only when the false positives are identified across a threshold number of instances, programs 124, and/or developers. This would ensure that a single developer negligently ignoring a legitimate security issue would not adversely impact the operation of the analysis tool 115 in detecting the legitimate security issue.

Figure 3A:
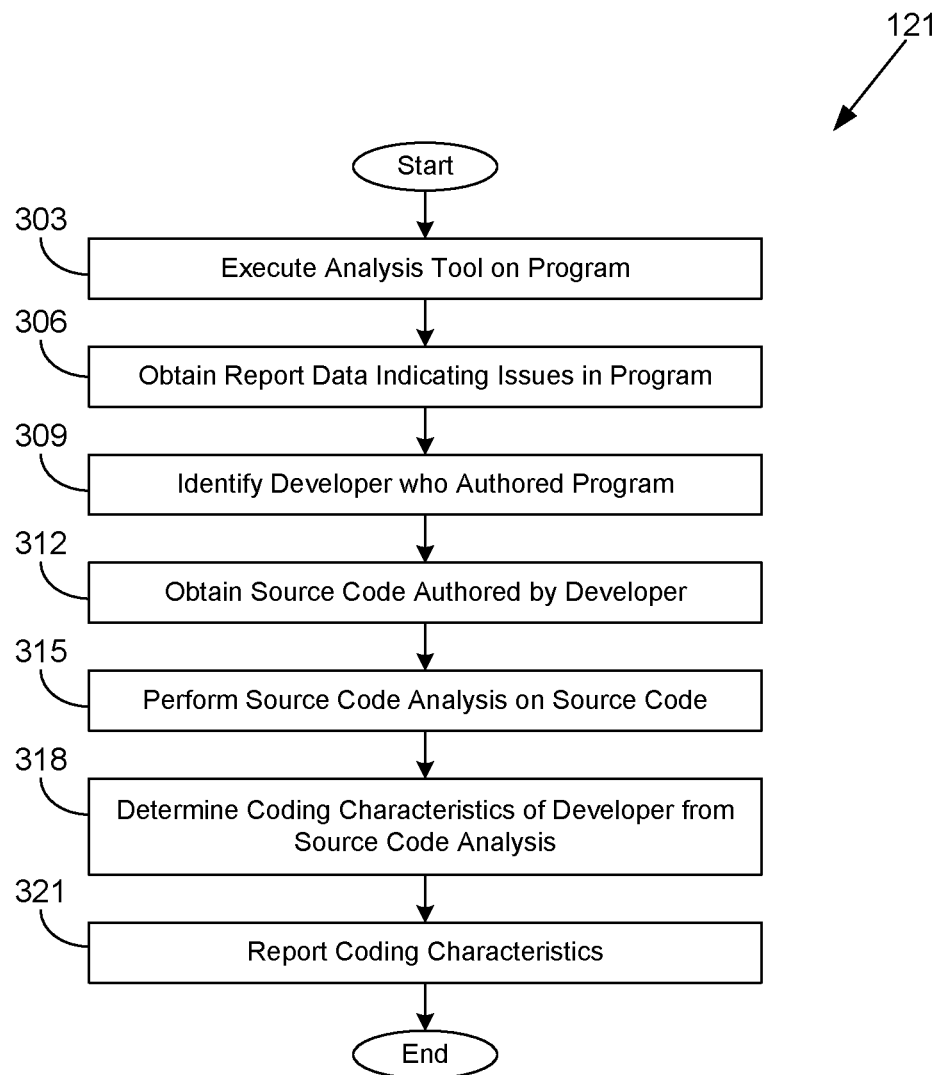
FIGS. 3A-3C are flowcharts illustrating examples of functionality implemented as portions of a user profiling application executed in a computing environment in the networked environment of FIG. 1 according to various embodiments of the present disclosure.

Moving on to FIG. 3A, shown is a flowchart that provides one example of the operation of a portion of the user profiling application 121 according to various embodiments. It is understood that the flowchart of FIG. 3A provides merely an example of the many different types of functional arrangements that may be employed to implement the operation of the portion of the user profiling application 121 as described herein. As an alternative, the flowchart of FIG. 3A may be viewed as depicting an example of elements of a method implemented in the computing environment 103 (FIG. 1) according to one or more embodiments.

Beginning with box 303, the user profiling application 121 executes an analysis tool 115 (FIG. 1) on a program 124 (FIG. 1). In some scenarios, the analysis tool 115 may have been previously executed on the program 124 (e.g., by a developer) and the results may be stored in the data store 112 (FIG. 1). In box 306, the user profiling application 121 obtains issue report data 148 (FIG. 1) that indicates issues present in the program 124.

In box 309, the user profiling application 121 identifies a developer who authored the program 124 when the program 124 contains at least a threshold number of issues, issues in a certain category, or issues of a certain impact in the scoring metadata 130 (FIG. 1), as configured by the user profiling configuration data 145 (FIG. 1). Alternatively, the user profiling application 121 may identify a developer who is responsible for specific source code of the program 124 that corresponds to at least a threshold quantity of the issues. In box 312, the user profiling application 121 obtains source code of the program 124 and potentially other programs 124 authored by the developer.

In box 315, the user profiling application 121 performs a source code analysis upon the source code attributable to, or written by, the developer. This source code analysis may include analysis of source code that does not contain or exhibit identified security issues. The source code analysis may also include analysis of the source code that is responsible for the identified security issues.

In box 318, the user profiling application 121 determines one or more coding characteristics 133 (FIG. 1) from the source code analysis. The coding characteristics 133 may be stylistic characteristics that do not directly cause a security issue. For example, the coding characteristics 133 may include a variable name characteristic (e.g., variable name case, length of variable names), an indication characteristic (e.g., whether indentation is used), an optional punctuation usage characteristics (e.g., placement of brackets in functions), a code commenting characteristic, and so on. The coding characteristics 133 may also relate to whether memory is freed, whether variables and methods are properly initialized, and so on. In some cases, source code analysis may be performed on source code not authored by the identified developer to provide a baseline in order to differentiate a unique coding style used by the identified developer.

In box 321, the user profiling application 121 reports the coding characteristics 133. In some cases, the coding characteristics 133 may be reported in association with the developer and the identified issues. For example, a network page presenting the report may be generated and sent to a client 106 (FIG. 1) for rendering by a client application 160 (FIG. 1). Alternatively, an email, text message, or other form of communication may be used for reporting. Thereafter, the operation of the portion of the user profiling application 121 ends.

Although the flowchart of FIG. 3A is described primarily with respect to a single developer and program 124, it is understood that the analysis of the user profiling application 121 may cross multiple programs 124 by multiple developers to identify specific developers who are particularly responsible for severe security vulnerabilities (i.e., meeting a threshold for scoring metadata 130) or whose code in general causes security vulnerabilities at a threshold frequency.

Figure 3B:
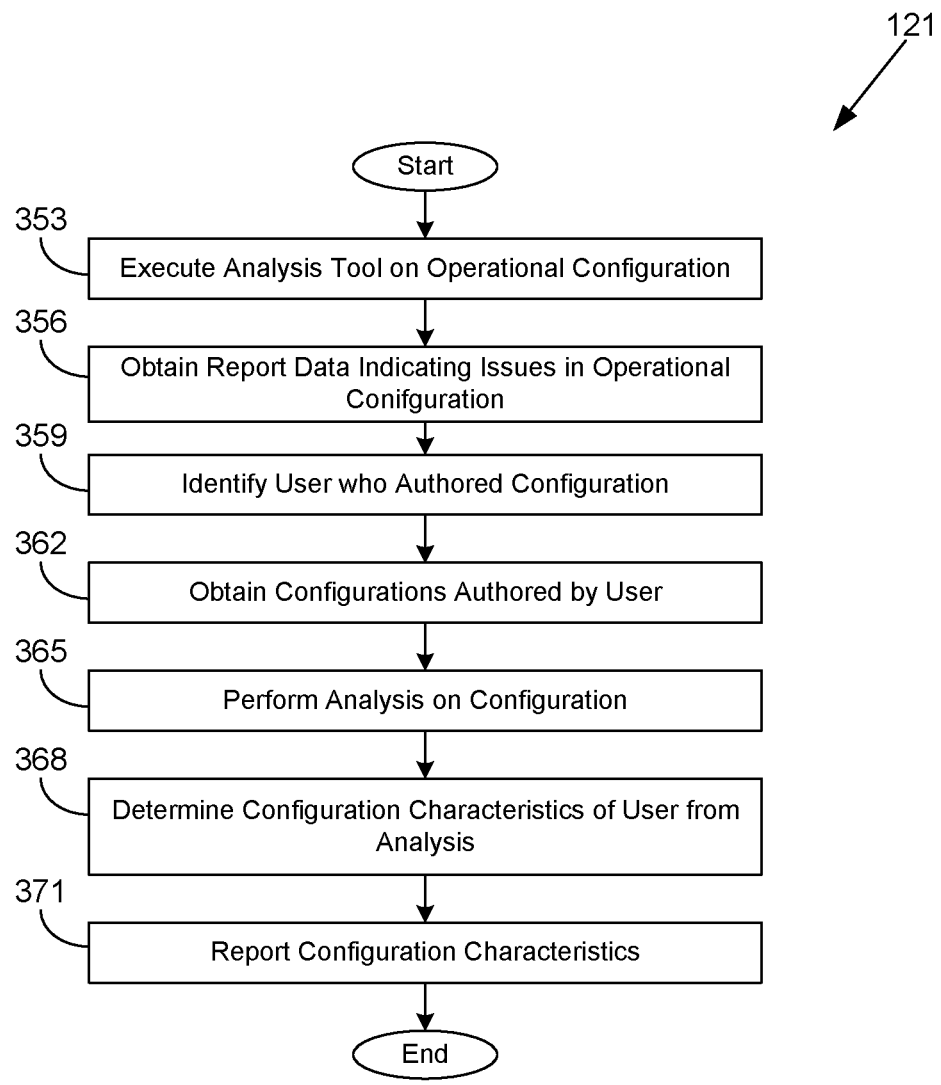

Turning now to FIG. 3B, shown is a flowchart that provides one example of the operation of a portion of the user profiling application 121 according to various embodiments. It is understood that the flowchart of FIG. 3B provides merely an example of the many different types of functional arrangements that may be employed to implement the operation of the portion of the user profiling application 121 as described herein. As an alternative, the flowchart of FIG. 3B may be viewed as depicting an example of elements of a method implemented in the computing environment 103 (FIG. 1) according to one or more embodiments.

Beginning with box 353, the user profiling application 121 executes an analysis tool 115 (FIG. 1) on an operational configuration of a computing device or program 124. In box 356, the user profiling application 121 obtains issue report data 148 (FIG. 1) that indicates issues present in the operational configuration.

In box 359, the user profiling application 121 identifies a user who authored or edited the operational configuration when the operational configuration contains at least a threshold number of issues, issues in a certain category, or issues of a certain impact in the scoring metadata 130 (FIG. 1), as configured by the user profiling configuration data 145 (FIG. 1). Alternatively, the user profiling application 121 may identify a user who is responsible for specific configuration settings that correspond to at least a threshold quantity of the issues. In box 362, the user profiling application 121 obtains other operational configurations authored by the user.

In box 365, the user profiling application 121 performs an analysis upon the operational configurations attributable to, or written by, the user. This analysis may include analysis of operational configurations that do not contain or exhibit identified security issues. The analysis may also include analysis of the configuration settings that are responsible for the identified security issues.

In box 368, the user profiling application 121 determines one or more configuration characteristics 134 (FIG. 1) from the analysis. The configuration characteristics 134 may be stylistic characteristics that do not directly cause a security issue. For example, the configuration characteristics 134 may include a variable name characteristic (e.g., variable name case, length of variable names), an indication characteristic (e.g., whether indentation is used), an optional punctuation usage characteristics (e.g., placement of brackets in functions), and so on. In some cases, analysis may be performed on configurations not authored by the identified user to provide a baseline in order to differentiate a unique configuration style used by the identified user.

In box 371, the user profiling application 121 reports the configuration characteristics 134. In some cases, the configuration characteristics 134 may be reported in association with the user and the identified issues. For example, a network page presenting the report may be generated and sent to a client 106 (FIG. 1) for rendering by a client application 160 (FIG. 1). Alternatively, an email, text message, or other form of communication may be used for reporting. Thereafter, the operation of the portion of the user profiling application 121 ends.

Although the flowchart of FIG. 3B is described primarily with respect to a single user and operational configuration, it is understood that the analysis of the user profiling application 121 may cross multiple operational configurations by multiple users to identify specific users who are particularly responsible for severe security vulnerabilities (i.e., meeting a threshold for scoring metadata 130) or whose configurations in general cause security vulnerabilities at a threshold frequency.

Figure 3C:
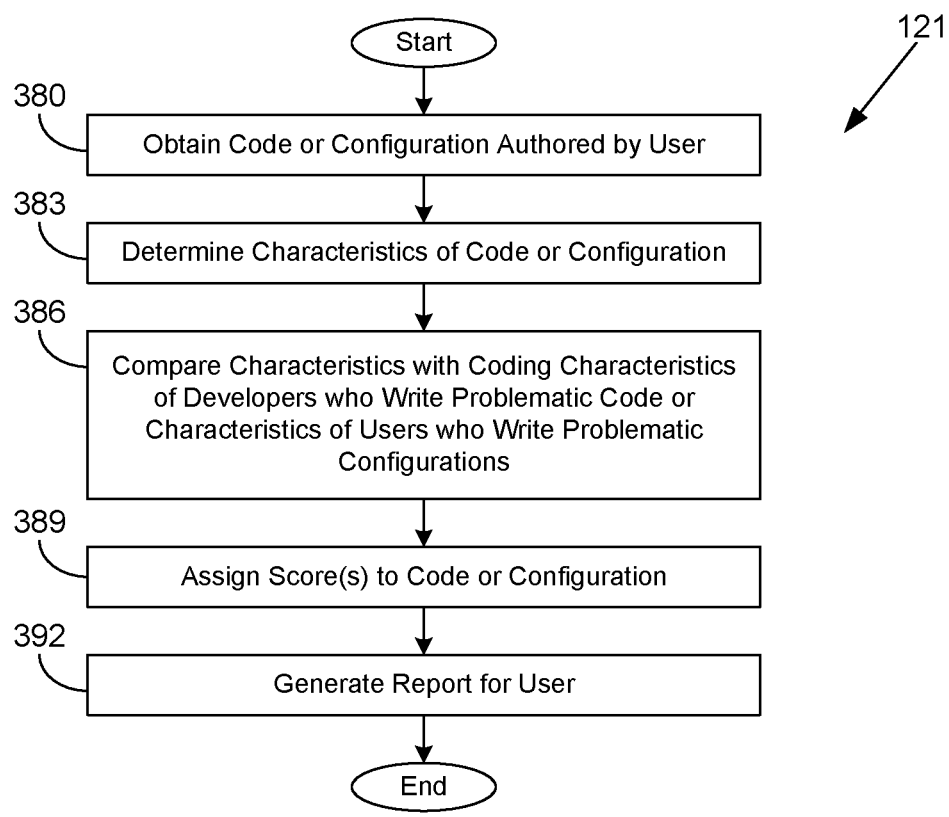

Moving on to FIG. 3C, shown is a flowchart that provides one example of the operation of a portion of the user profiling application 121 according to various embodiments. It is understood that the flowchart of FIG. 3C provides merely an example of the many different types of functional arrangements that may be employed to implement the operation of the portion of the user profiling application 121 as described herein. As an alternative, the flowchart of FIG. 3C may be viewed as depicting an example of elements of a method implemented in the computing environment 103 (FIG. 1) according to one or more embodiments.

In box 380, the user profiling application 121 obtains code or a configuration authored by a user. In one example, the user may enter code via a network page or other user interface. In another example, the user may write code upon a whiteboard and the code may be automatically recognized from an image. In box 383, the user profiling application 121 determines characteristics of the code or the configuration. These characteristics may correspond to the coding characteristics 133 (FIG. 1) or configuration characteristics 134 (FIG. 1), as the case may be. As a non-limiting example, it may be determined that the user has written code characterized by single-letter variable names.

In box 386, the user profiling application 121 may compare the identified characteristics with coding characteristics 133 of developers who are determined to write problematic code, or with configuration characteristics 134 of developers who are determined to write problematic configurations. As a non-limiting example, the fact that the code is characterized by single-letter variable names may be compared to characteristics of code written by developers who often introduce security vulnerabilities.

In box 389, the user profiling application 121 may assign one or more scores to the user based at least in part on the comparison. If problematic developers often use single-letter variable names and the instant user writes code characterized by single-letter variable names, the user may be given a low coding quality score. In box 392, the user profiling application 121 may generate a report with the identified characteristics and assigned scores. Thereafter, the operation of the portion of the user profiling application 121 ends.

Figure 4:
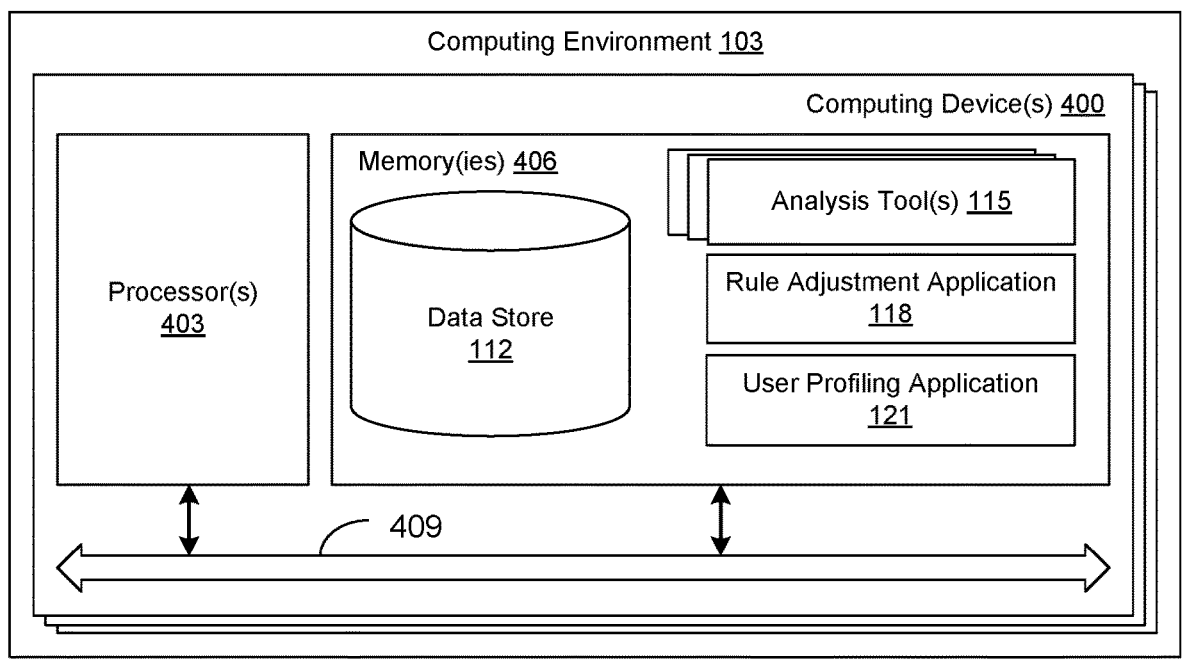
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are analysis tools 115, a rule adjustment application 118, a user profiling application 121, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the analysis tools 115, the rule adjustment application 118, the user profiling application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-3C show the functionality and operation of an implementation of portions of the rule adjustment application 118 and the user profiling application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2-3C show a specific order of execution, it is understood that the order of execution may differ from that which is depicted. For example, the order of execution of two or more blocks may be scrambled relative to the order shown. Also, two or more blocks shown in succession in FIGS. 2-3C may be executed concurrently or with partial concurrence. Further, in some embodiments, one or more of the blocks shown in FIGS. 2-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including analysis tools 115, the rule adjustment application 118, and the user profiling application 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including analysis tools 115, the rule adjustment application 118, and the user profiling application 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 103. Additionally, it is understood that terms such as "application," "service," "system," "engine," "module," "program," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   perform a first security analysis upon a plurality of first revisions of a plurality of programs, the first security analysis being based at least in part on a plurality of rules;
   generate first report data identifying a first plurality of security issues found in the first security analysis;
   perform a second security analysis upon a plurality of second revisions of the plurality of programs, the second security analysis being based at least in part on the plurality of rules;
   generate second report data identifying a second plurality of security issues found in the second security analysis; and
   cause a particular rule of the plurality of rules to be disabled or assigned a lesser weight, based at least in part on an identification that a particular security issue of the first plurality of security issues remains uncorrected in the plurality of second revisions, indicating that a false positive is provoked by the particular rule as determined based at least in part on a comparison of the first plurality of security issues to the second plurality of security issues.

2. The non-transitory computer-readable medium of claim 1, wherein when executed the program further causes the at least one computing device to at least determine a developer who wrote first source code corresponding to at least a threshold quantity of the first plurality of security issues that are corrected in the plurality of second revisions.

3. The non-transitory computer-readable medium of claim 2, wherein when executed the program further causes the at least one computing device to at least determine a coding characteristic associated with the developer based at least in part on a source code analysis of second source code written by the developer.

4. The non-transitory computer-readable medium of claim 3, wherein the coding characteristic comprises at least one of: a variable name characteristic, an indentation characteristic, a code commenting characteristic, or an optional punctuation usage characteristic.

5. A system, comprising:
   at least one computing device; and
   at least one application executable in the at least one computing device, wherein when executed the at least one application causes the at least one computing device to at least:
   perform a security analysis upon at least one first revision of at least one program, the security analysis being based at least in part on a plurality of rules;
   identify at least one first security issue found in the security analysis upon the at least one first revision of the at least one program;
   perform the security analysis upon at least one second revision of the at least one program;
   identify at least one second security issue found in the security analysis upon the at least one second revision of the at least one program; and
   cause a particular rule of the plurality of rules to be updated based at least in part on an identification that a particular security issue of the at least one first security issue remains uncorrected in the at least one second revision, indicating that a false positive is provoked by the particular rule as determined based at least in part on a comparison of the at least one first security issue to the at least one second security issue.

6. The system of claim 5, wherein when executed the at least one application further causes the at least one computing device to at least determine a developer who wrote first source code corresponding to at least a threshold quantity of the at least one first security issue that are corrected in the at least one second revision.

7. The system of claim 6, wherein when executed the at least one application further causes the at least one computing device to at least determine a coding characteristic associated with the developer based at least in part on a source code analysis of second source code written by the developer.

8. The system of claim 7, wherein the coding characteristic comprises at least one of: a variable name characteristic, an indentation characteristic, a code commenting characteristic, or an optional punctuation usage characteristic.

9. The system of claim 7, wherein the coding characteristic is a stylistic characteristic that does not directly cause a security issue.

10. The system of claim 7, wherein the second source code does not exhibit the at least one first security issue or the at least one second security issue.

11. The system of claim 5, wherein when executed the at least one application further causes the at least one computing device to at least:
    generate first report data that identifies the at least one first security issue found in the security analysis upon the at least one first revision of the at least one program; and
    generate second report data that identifies the at least one second security issue found in the security analysis upon the at least one second revision of the at least one program.

12. The system of claim 5, wherein causing the plurality of rules to be updated further comprises modifying a configuration of a security analysis tool used to perform the security analysis.

13. The system of claim 5, wherein when executed the at least one application further causes the at least one computing device to automatically execute a security analysis tool to perform the security analysis upon the at least one second revision of the at least one program in response to receiving the at least one second revision of the at least one program.

14. The system of claim 5, wherein the security analysis comprises a static code analysis and a dynamic code analysis.

15. A method, comprising:
    performing, via at least one of one or more computing devices, a security analysis upon at least one first revision of at least one program, the security analysis being based at least in part on a plurality of rules;
    identifying, via at least one of the one or more computing devices, at least one first security issue found in the security analysis upon the at least one first revision of the at least one program;
    performing, via at least one of the one or more computing devices, the security analysis upon at least one second revision of the at least one program;
    identifying, via at least one of the one or more computing devices, at least one second security issue found in the security analysis upon the at least one second revision of the at least one program; and
    causing, via at least one of the one or more computing devices, the plurality of rules to be updated based at least in part on an identification that the at least one first security issue remains uncorrected in the at least one second revision, indicating that a false positive is provoked by the plurality of rules as determined based at least in part on a comparison of the at least one first security issue to the at least one second security issue.

16. The method of claim 15, further comprising determining, via at least one of the one or more computing devices, a developer who wrote first source code corresponding to at least a threshold quantity of the at least one first security issue that are corrected in the at least one second revision.

17. The method of claim 16, further comprising determining, via at least one of one or more computing devices, a coding characteristic associated with the developer based at least in part on a source code analysis of second source code written by the developer.

18. The method of claim 17, wherein the coding characteristic comprises at least one of: a variable name characteristic, an indentation characteristic, a code commenting characteristic, or an optional punctuation usage characteristic.

19. The method of claim 15, wherein causing the plurality of rules to be updated further comprises modifying, via at least one of the one or more computing devices, a configuration of a security analysis tool used to perform the security analysis.

20. The method of claim 15, further comprising determining, via at least one of one or more computing devices, whether the at least one first security issue is corrected in the at least one second revision further based at least in part on manual selection data indicating a subset of the at least one first security issue that is planned to be corrected in the at least one second revision of the at least one program.

* * * * *